United States Patent
Chen et al.

(10) Patent No.: US 11,037,016 B2
(45) Date of Patent: Jun. 15, 2021

(54) FEATURE DETERMINATION APPARATUS AND METHOD ADAPTED TO MULTIPLE OBJECT SIZES

(71) Applicant: Institute For Information Industry, Taipei (TW)

(72) Inventors: Yen-Lin Chen, Taipei (TW); Hong-Yi Liang, Taipei (TW); Xiu-Zhi Chen, Kaohsiung (TW); Chao-Wei Yu, Pingtung County (TW); Meng-Tsan Li, Taichung (TW)

(73) Assignee: Institute For Information Industry, Taipei (TW)

( * ) Notice: Subject to any disclaimer, the term of this patent is extended or adjusted under 35 U.S.C. 154(b) by 77 days.

(21) Appl. No.: 16/391,621

(22) Filed: Apr. 23, 2019

(65) Prior Publication Data

US 2020/0151492 A1    May 14, 2020

(30) Foreign Application Priority Data

Nov. 9, 2018 (TW) ................ 107139866

(51) Int. Cl.
  *G06K 9/62* (2006.01)
  *G06K 9/46* (2006.01)
  *G06N 3/04* (2006.01)
(52) U.S. Cl.
  CPC ......... *G06K 9/4604* (2013.01); *G06K 9/6256* (2013.01); *G06K 9/6268* (2013.01); *G06N 3/0454* (2013.01)
(58) Field of Classification Search
  USPC ........................................ 382/199, 157, 190
  See application file for complete search history.

(56) References Cited

U.S. PATENT DOCUMENTS

| | | | |
|---|---|---|---|
| 10,007,865 B1 * | 6/2018 | Kim | G06K 9/00624 |
| 10,579,924 B1 * | 3/2020 | Kim | G06N 5/046 |
| 10,646,156 B1 * | 5/2020 | Schnorr | G06N 3/0454 |
| 10,692,209 B2 * | 6/2020 | Sashida | G06T 7/11 |
| 2014/0267833 A1 * | 9/2014 | Chen | G06T 5/003 348/239 |
| 2016/0259994 A1 * | 9/2016 | Ravindran | G06N 3/08 |
| 2017/0304732 A1 * | 10/2017 | Velic | G06K 9/6255 |
| 2017/0372174 A1 * | 12/2017 | Wshah | G06N 3/0454 |
| 2018/0137406 A1 | 5/2018 | Howard et al. | |

FOREIGN PATENT DOCUMENTS

| | | |
|---|---|---|
| CN | 105303508 A | 2/2016 |
| CN | 108154194 A | 6/2018 |

* cited by examiner

*Primary Examiner* — Kathleen Y Dulaney
(74) *Attorney, Agent, or Firm* — Skaar Ulbrich Macari, P.A.

(57) ABSTRACT

A feature determination apparatus and method adapted to multiple object sizes are provided. The apparatus individually supplies each of the object images to a convolution neural network having several convolution layers to generate multiple feature maps corresponding to each object image. The apparatus calculates a feature amount of each feature image of each object image. The apparatus determines an invalid layer start number of each object image according to a preset threshold and the feature amount corresponding to each object image. The apparatus determines a feature map extraction recommendation for each of a plurality of object sizes according to a size of each object image and the invalid layer start number of each object image.

14 Claims, 9 Drawing Sheets

S901 — Determining a switch layer number by counting the invalid start layer numbers S903 — Generating a hybrid convolutional neural network having a plurality of convolution layers as an image object detection model according to the switch layer number

|  |  |  |  |  |
|---|---|---|---|---|
| 0 | 0 | 0 | 0 | 0 |
| 128 | 128 | 128 | 128 | 0 |
| 0 | 255 | 128 | 0 | 0 |
| 0 | 128 | 0 | 0 | 0 |
| 0 | 0 | 0 | 0 | 0 |

FEATURE DETERMINATION APPARATUS AND METHOD ADAPTED TO MULTIPLE OBJECT SIZES

PRIORITY

This application claims priority to Taiwan Patent Application No. 107139866 filed on Nov. 9, 2018, which is hereby incorporated by reference in its entirety.

FIELD

The present invention relates to a feature determination apparatus and method. More particularly, the present invention relates to a feature determination apparatus and method adapted to multiple object sizes.

BACKGROUND

With the rapid development of computing hardware and deep learning technology, many computer vision apparatuses and image processing apparatuses (e.g., roadside apparatuses) have adopted object detection models established by deep learning technology to detect object(s) in images or image sequences. Currently, the deep learning models that are widely adopted in the computer vision technology and the image processing technology include the Convolutional Neural Network (CNN) model, the Region-based Convolutional Neural Network (R-CNN) model, Fast Region-based Convolutional Neural Network (Faster R-CNN) model, etc.

No matter which kind of deep learning model is adopted, the deep learning model has to be trained before becoming the actual object detection model to be used. At present, some deep learning technologies (e.g., Single Shot Multibox Detector (SSD)) train an object detection model by using images along with the feature maps which correspond to some convolution layers of the images in the deep learning model to improve the accuracy of the object detection model. Due to the limited hardware resources, conventional technologies predetermine which convolution layer(s) will a feature map (or feature maps) be extracted from. However, since the size of each object may be different, conventional technologies are very likely to extract an invalid feature map (i.e., feature map with few feature amount). As a consequence, computing resources are wasted and accuracy of the trained object detection model cannot be improved.

Figure 1:
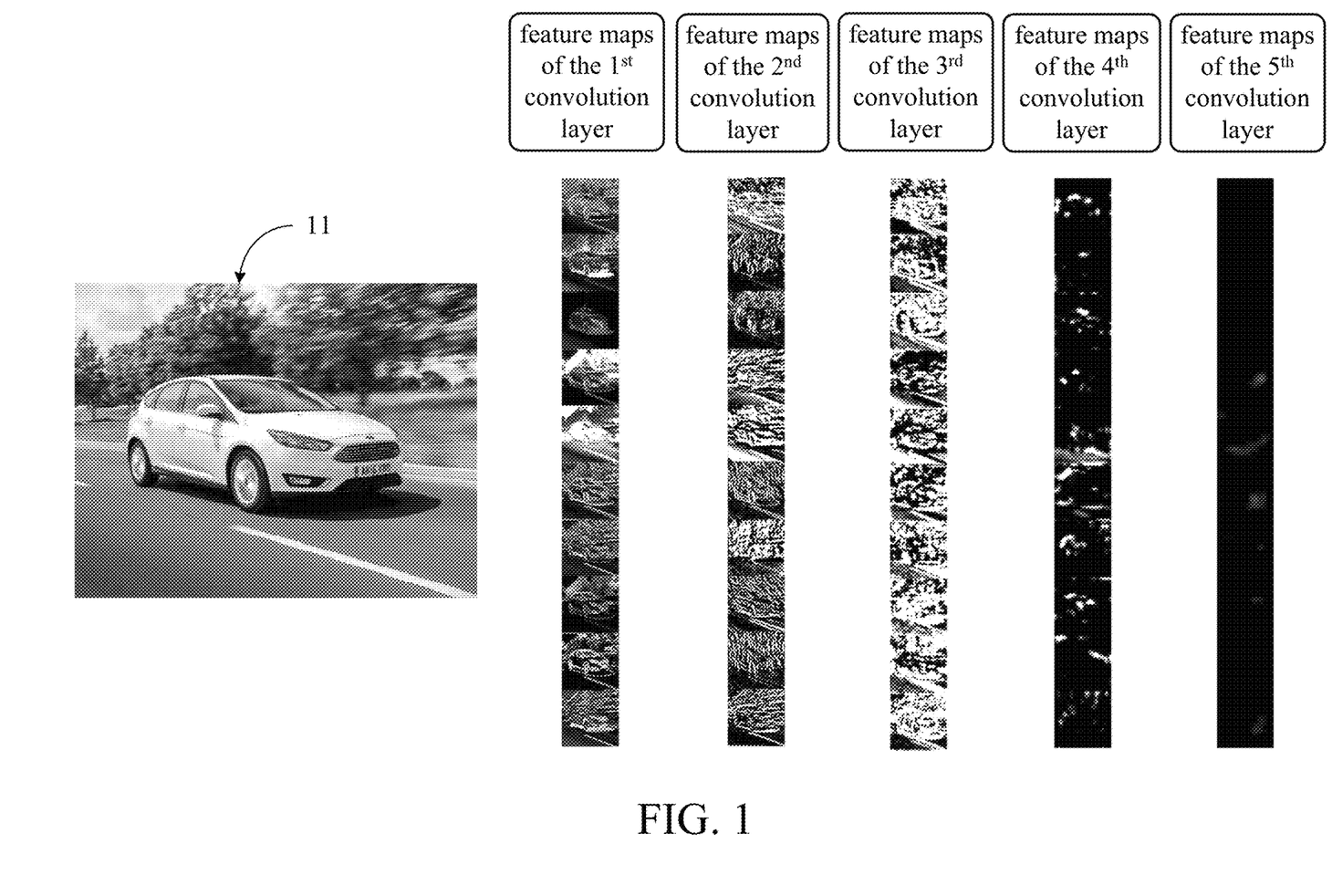
FIG. 1 depicts an image having an object "car" therein and a plurality of feature maps regarding the image at a plurality convolution layers of a deep learning model.
Figure 2:
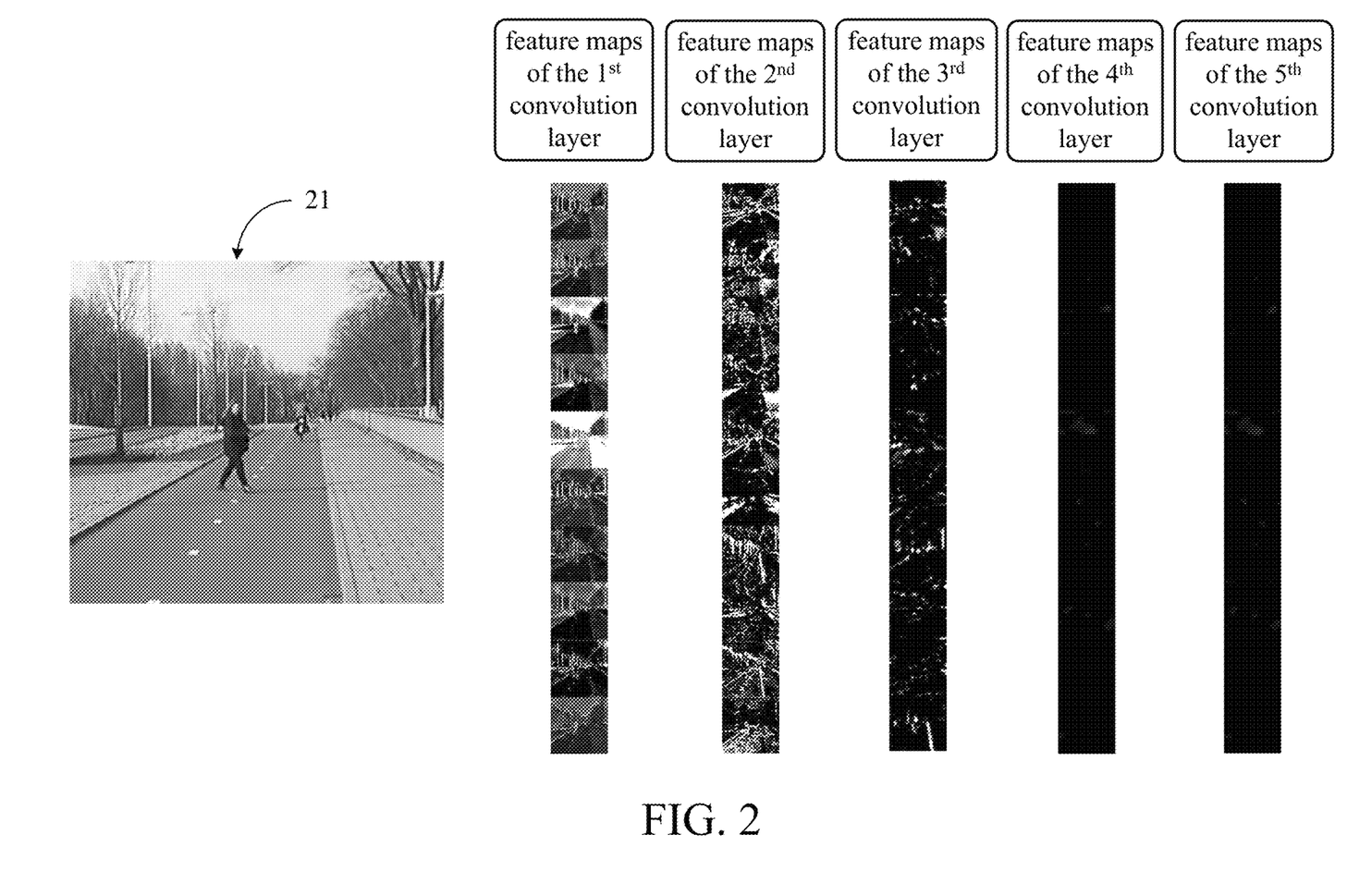
FIG. 2 depicts an image having an object "person" therein and a plurality of feature maps regarding the image at a plurality convolution layers of a deep learning model.

For understanding, please refer to the specific examples shown in FIG. 1 and FIG. 2. FIG. 1 depicts an image 11 having an object "car" therein and a plurality of feature maps regarding the image 11 at the first to the fifth convolution layer of the deep learning model. In FIG. 1, each of the feature maps corresponds to the fifth convolution layer is either all black or nearly all black, which means that the feature amount in these feature maps is extremely few (i.e., the useful information is extremely few) and, hence, each of these feature maps can be regarded as an invalid feature map. FIG. 2 depicts an image 21 having an object "person" therein and a plurality of feature maps regarding the image 21 at the first to the fifth convolution layer of the deep learning model. In FIG. 2, each of the feature maps corresponds to the fourth and fifth convolution layer is either all black or nearly all black, which means that the feature amount in these feature maps is extremely few and, hence, each of these feature maps can be regarded as an invalid feature map.

By comparing FIG. 1 and FIG. 2, it can be learned that the size of the object in the image 21 is smaller, so the feature maps corresponds to the fourth convolution layer is already all black or nearly all black. On the contrary, the size of the object in the image 11 is larger, so the feature maps will not become all black or nearly all black until the fifth convolution layer. Therefore, as the size of object varies from image to image, predetermining which convolution layer(s) will a feature map (or feature maps) be extracted from will extract useless information in some cases, which results in the meaningless calculations and cannot make the trained object detection model has a higher accuracy.

Another problem with the current deep learning model is that it requires a large number of conventional convolution operations, so the hardware is in high demand and it is not easy to be realized on the embedded platform. To solve the aforementioned problems, some lightweight (i.e., require less computation) deep learning models have been developed, such as a depth-wise separable convolution neural network. However, these lightweight deep learning models often produce invalid feature maps (i.e., feature maps with few feature amount) after performing several layers of convolution operations, which causes the waste of subsequent computing resources.

Accordingly, there is an urgent need for a technique that can provide feature map extraction suggestions according to different object sizes to avoid meaningless calculations.

SUMMARY

An objective is to provide a feature determination apparatus adapted to a plurality of object sizes. An apparatus can comprise a storage and a processor, and the processor is electrically connected to the storage. The storage stores a plurality of object images. The processor supplies each of the object images to a convolution neural network having a plurality of convolution layers to generate a plurality of feature maps corresponding to each object image, wherein each of the feature maps corresponds to one of the convolution layers. The processor calculates a feature amount of each feature image of each object image. The processor determines an invalid layer start number of each object image according to a preset threshold and the feature amounts corresponding to each object image, wherein each of the invalid layer start numbers corresponds to one of the convolution layers. The processor determines a feature map extraction recommendation for each of the object sizes according to a size of each object image and the invalid layer start number of each object image, wherein each of the feature map extraction recommendations corresponds to a portion of the convolution layers.

Another objective is to provide a feature determination method adapted to a plurality of object sizes, which is adapted for use in an electronic apparatus. The electronic apparatus stores a plurality of object images, and the feature determination method can comprise the following steps: (a) supplying each of the object images to a convolution neural network having a plurality of convolution layers to generate a plurality of feature maps corresponding to each object image, wherein each of the feature maps corresponds to one of the convolution layers, (b) calculating a feature amount of each feature image of each object image, (c) determining an invalid layer start number of each object image according to a preset threshold and the feature amounts corresponding to each object image, wherein each of the invalid layer start numbers corresponds to one of the convolution layers, and (d) determines a feature map extraction recommendation for each of the object sizes according to a size of each object image and the invalid layer start number of each object image, wherein each of the feature map extraction recommendations corresponds to a portion of the convolution layers.

According to the above descriptions, the feature determination technology (including the apparatus and the method) adapted to a plurality of object sizes determines an invalid layer start number of each object image by analyzing the feature amount of each feature map regarding each object image in a plurality convolution layers of the convolutional neural network, and determines a feature map extraction recommendation for each of the object sizes by counting the invalid layer start number of each object image according to the size of each object image. Through the aforesaid operations, the feature determination technology adapted to a plurality of object sizes provides different feature map extraction recommendation for different object size, thereby overcome the problems of extracting invalid feature maps and performing meaningless calculations due to only extracting feature maps correspond to one (or some) fixed convolution layer of the conventional technologies.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 5A depicts a specific example of the feature image 31a-2 of the object image 31a;

DETAILED DESCRIPTION

In the following description, a feature determination apparatus and method adapted to multiple object sizes will be explained with reference to example embodiments thereof. However, these example embodiments are not intended to limit the present invention to any specific embodiment, example, environment, applications, or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction. In addition, dimensions of individual elements and dimensional relationships among individual elements in the attached drawings are provided only for illustration but not to limit the scope of the present invention.

Figure 3:
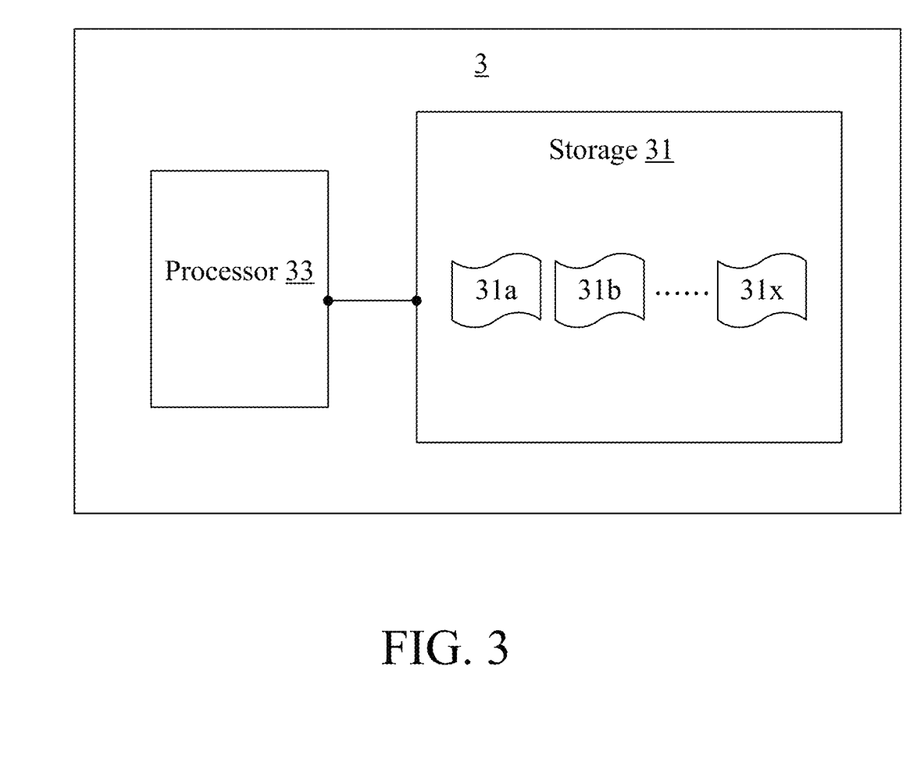
FIG. 3 depicts a schematic view of the feature determination apparatus adapted to multiple object sizes of the first embodiment.

A first embodiment of the present invention is a feature determination apparatus 3 adapted to multiple object sizes and a schematic view of which is depicted in FIG. 3. The feature determination apparatus 3 comprises a storage 31 and a processor 33, wherein the processor 33 is electrically connected to the storage 31. The storage 31 may be a memory, a Universal Serial Bus (USB) disk, a hard disk, a Compact Disk (CD), a mobile disk, or any other storage medium or circuit known to those of ordinary skill in the art and having the same functionality. The processor 33 may be any of various processors, Central Processing Units (CPUs), microprocessors, digital signal processors or other computing apparatuses known to those of ordinary skill in the art. In some embodiments, the feature determination apparatus 3 can be, but not limited to, a roadside monitoring apparatus, a video recorder, an information gathering apparatus of a license plate recognition system, or the like.

The storage 31 stores a plurality of object images 31a, 31b, . . . , 31x. The object images 31a, 31b, . . . , 31x are images mainly based on an object (i.e., the area occupied by the object in the image is larger than a predetermined ratio, such as 95%). In some other embodiments, the feature determination apparatus 3 may use any kind of image under the condition that each image has an object there in and the position information regarding the object in the image is given, and thereby the feature determination apparatus 3 can obtain an object image from the image according to the position information.

In the present embodiment, the feature determination apparatus 3 obtains the feature maps regarding the object images 31a, 31b, . . . , 31x in different convolution layers of a convolutional neural network and then calculates the feature amount of each of the feature maps. Then, the feature determination apparatus 3 determines an invalid layer start number of each object image according to a preset threshold and the feature amounts, performs counting based on the object size and the invalid layer start number of each object image, and determines a feature map extraction recommendation for each of the object sizes accordingly. It shall be appreciated that a convolutional neural network also includes other layers, such as a pooling layer and a rectified linear unit layer. Since the present invention focuses on the operation and analysis related to the convolution layer, only the implementation details related to the present invention will be detailed in the following paragraphs.

Specifically, the processor 33 supplies the object images 31a, 31b, . . . , 31x to a convolutional neural network having a plurality of convolution layers (e.g., n layers, where n is a positive integer) to generate a plurality of feature maps corresponding to the object images 31a, 31b, . . . , 31x respectively, wherein each of the feature maps corresponds to one of the convolution layers. Each convolution layer of the convolutional neural network has at least one filter to perform convolution operations individually. It shall be appreciated that the present invention does not limit the number of the filters that a convolution layer can have. For convenience, the following descriptions will be based on the situation that a convolution layer has a filter. As to the situation that a convolution layer has multiple layers, those of ordinary skill in the art shall easily appreciate the required operations according to the following descriptions.

Specifically, after supplying an object image to the convolutional neural network, for each convolution layer, the processor 33 performs a convolution operation to an input of the convolution layer with the filter of the convolution layer to generate a feature map. A feature map contains a plurality of cells, and the number of cells depends on the size of the feature map. For example, if the size of the feature map is 4*4, the feature map has 16 cells. It shall be appreciated that the number of layers that a convolutional neural network has, the number of filters corresponding to each convolution layer, the parameters of each filter, and how each convolution layer produces a feature map with a corresponding filter are not the focuses of the present invention, which shall be appreciated by those of ordinary skill in the art and thus will not be further described herein.

Figure 4:
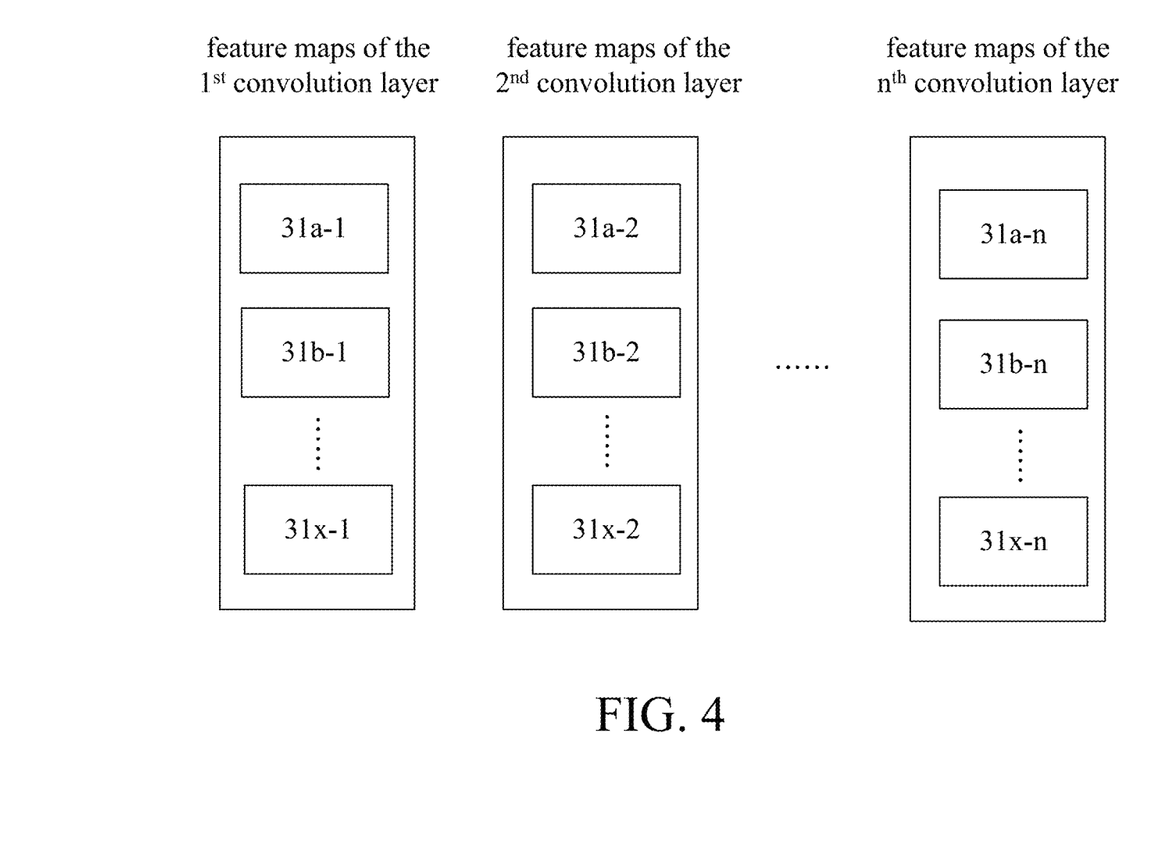
FIG. 4 depicts the concept of the feature maps corresponding to a plurality of convolution layers of a plurality of object images.

For convenience, please refer to a specific example shown in FIG. 4, which, however, is not intended to limit the scope of the present invention. In this specific example, after the processor 33 supplies the object image 31a to the convolutional neural network, the feature maps 31a-1, 31a-2, . . . , 31a-n are obtained at the first layer, the second layer, . . . , and the $n^{th}$ layer of the convolution layers respectively. Similarly, after the processor 33 supplies the object image 31b to the convolutional neural network, the feature maps 31b-1, 31b-2, . . . , 31b-n are obtained at the first layer, the second layer, . . . , and the $n^{th}$ layer of the convolution layers respectively. Similarly, after the processor 33 inputs the object image 31x to the convolutional neural network, the feature maps 31x-1, 31x-2, . . . , 31x-n are obtained at the first layer, the second layer, . . . , and the $n^{th}$ layer of the convolution layers respectively. After the processor 33 supplies other object images to the convolutional neural network, the corresponding feature maps are also obtained at each convolution layer. The details will not be repeated herein.

Next, the processor 33 calculates a feature amount of each of the feature maps of each of the object images 31a, 31b, . . . , 31x. The feature amount is used to estimate the amount of image information carried by the corresponding feature map. In some embodiments, the feature amount of a feature map is a ratio between an amount of non-zero cell and an amount of total cell on the feature map. In these embodiments, the processor 33 may count the cells of a feature map (i.e., if the cell is a non-zero cell, the count is 1; if the cell is a zero cell, the count is 0) according to the following Equation (1), and then the processor 33 calculates the feature amount of the feature map according to the Equation (2).

$$f(x, y) = \begin{cases} 1, & \text{feature map } (x, y) \neq 0 \\ 0, & \text{feature map } (x, y) = 0 \end{cases} \quad (1)$$

$$FR = \frac{\sum_{y}^{H}\sum_{x}^{W} f(x, y)}{H \times W} \quad (2)$$

In the above Equations (1) and (2), the variables x and y are positive integers, the function $f(x, y)$ is the count corresponding to the cell at the coordinate position (x, y) of the feature map, the function feature map (x, y) is the value of the cell of the coordinate position (x, y) of the feature map, the variable FR represents the feature amount, the variable H is the height of the feature map, and the variable W is the width of the feature map.

Figure 5A:
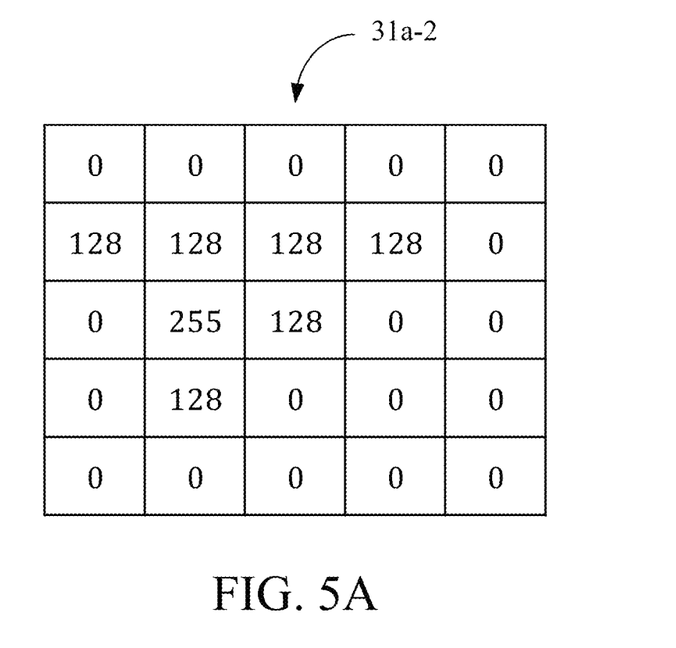

For comprehension, please refer to a specific example shown in FIG. 5A, which, however, is not intended to limit the scope of the present invention. In this specific example, the feature image 31a-2 of the object image 31a has a size of 5*5, and the value of each cell is as shown in FIG. 5A. The processor 33 calculates the ratio between the amount of non-zero cell and the amount of total cell on the feature map 31a-2 according to the above Equation (1) and Equation (2), and obtains the feature amount of the feature map 31a-2 is 7/25. It shall be appreciated that the present invention does not limit the method to calculate the feature amount of a feature map. Any method for evaluating the amount of information carried by a feature map (e.g., the amount of non-zero cells, the distribution of the value of the cells, the ratio of continuous non-zero cells, the density of non-zero cells, etc.) are within the scope of the present invention.

Next, the processor 33 determines an invalid layer start number of each of the object image 31a, 31b, . . . , 31x according to a preset threshold and the feature amount corresponding to each of the object image 31a, 31b, . . . , 31x, wherein each of the invalid layer start numbers corresponds to one of the convolution layers of the convolutional neural network. Specifically, each of the object images 31a, 31b, . . . , 31x has a corresponding feature amount for each convolution layer, and the processor 33 determines an invalid layer start number of each of the object image 31a, 31b, . . . , 31x by comparing a preset threshold and the feature amounts corresponding to each of the object image 31a, 31b, . . . , 31x.

In some embodiments, if an object image has a plurality of feature images in a convolution layer, the feature amount corresponding to the object image in a convolution layer is a statistic (e.g., an average value) of all the feature amount corresponding to the object image in the convolution layer. In the present embodiment, the processor 33 calculates the corresponding feature amount for each feature image of each of the object images 31a, 31b, . . . , 31x (as described above, each feature map corresponds to a certain convolution layer) according to the order of convolution processing. If the processor 33 determines that the feature amount of an object image (e.g., the object image 31a) is less than the preset threshold for the first time, the processor 33 records the convolution layer whose feature amount is less than the preset threshold for the first time as an invalid layer and determines that the number of the invalid layer as an invalid layer start number.

Figure 5B:
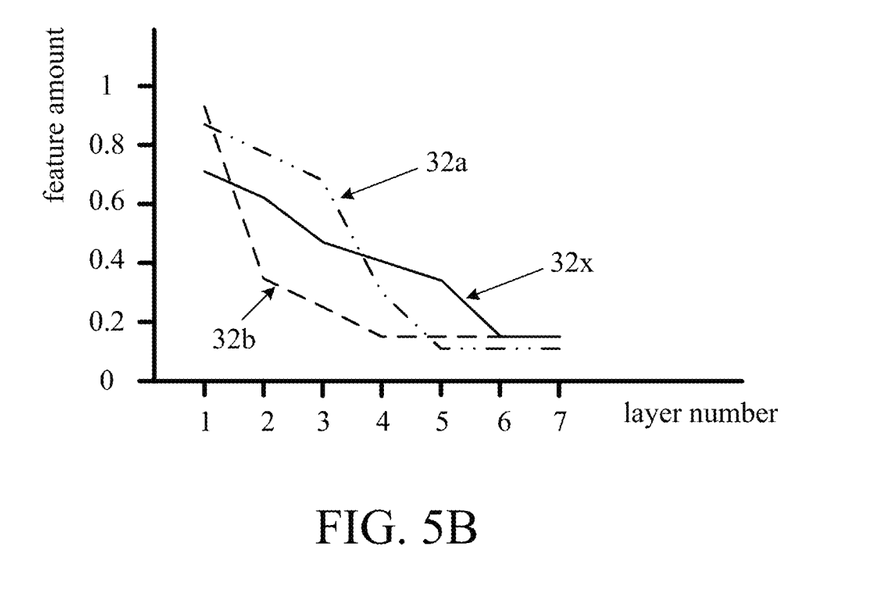
FIG. 5B depicts the feature amount distribution curves 32a, 32b, and 32x, which corresponds to the object images 31a, 31b, and 31x respectively.

For comprehension, please refer to a specific example shown in FIG. 5B, which, however, is not intended to limit the scope of the present invention. FIG. 5B depicts the feature amount distribution curves 32a, 32b, and 32x corresponding to the object images 31a, 31b, and 31x respectively. It is assumed that the preset threshold is 0.2. From the feature amount distribution curve 32a, it is learned that the feature amount of the object image 31a begins to be less than the preset threshold from the fifth convolution layer and, hence, the processor 33 determines that the invalid layer start number of the object image 31a is 5. From the feature amount distribution curve 32b, it is learned that the feature amount of the object image 31b begins to be less than the preset threshold from the fourth convolution layer and, hence, the processor 33 determines that the invalid layer start number of the object image 31b is 4. Similarly, from the feature amount distribution curve 32x, it is learned that the feature amount of the object image 31x begins to be less than the preset threshold from the sixth convolution layer and, hence, the processor 33 determines that the invalid layer start number of the object image 31x is 6. The invalid layer start numbers of the object images 31a, 31b, and 31x are 5, 4, and 6 respectively, which means that the object images 31a, 31b, and 31x have insufficient feature amounts from the fifth, fourth, and sixth convolution layers respectively.

Next, the processor 33 determines a feature map extraction recommendation for each of the object sizes according to a size of each of the object images 31a, 31b, . . . , 31x and the invalid layer start number of each of the object images 31a, 31b, . . . , 31x, wherein each of the feature map extraction recommendation corresponds to a portion of the convolution layers. The feature map extraction recommendations determined by the processor 33 for different object sizes can be used in the training phase or recognition phase of the convolutional neural network.

In some embodiments, the processor 33 determines the feature map extraction recommendation for each object size by performing the following operations. First, the processor 33 divides the object images 31a, 31b, . . . , 31x into a plurality of groups according to the size of each object image, wherein the rules for distinguishing the object images into different groups (e.g. the size range of each group) may be predetermined according to experiences or the purpose. In one embodiment, the size of the object images in the same group is the same or close (e.g., the difference of the sizes is less than 5%).

Next, the processor 33 performs the following operations for each of the groups: determining the feature map extraction recommendation by counting the invalid layer start numbers of the object images of the group. For example, for each group, the processor 33 may select a smallest invalid layer start number from the invalid layer start numbers corresponding to the object images of that group as a common invalid layer start number of that group and then select the previous layer or the previous several layers of the common invalid layer start number as a feature map extraction recommendation of that group, wherein the shallower convolution layer in the convolutional neural network corresponds to a smaller number. For example, if the common invalid layer start number of a group is k, the feature map extraction recommendation may be the $(k-1)^{th}$ convolution layer or n convolution layers including the $(k-n)^{th}$, the $(k-n+1)^{th}$, . . . , and the $(k-1)^{th}$ convolution layers, wherein the variable k and the variable n are both positive integers and k is greater than n.

Figure 6A:
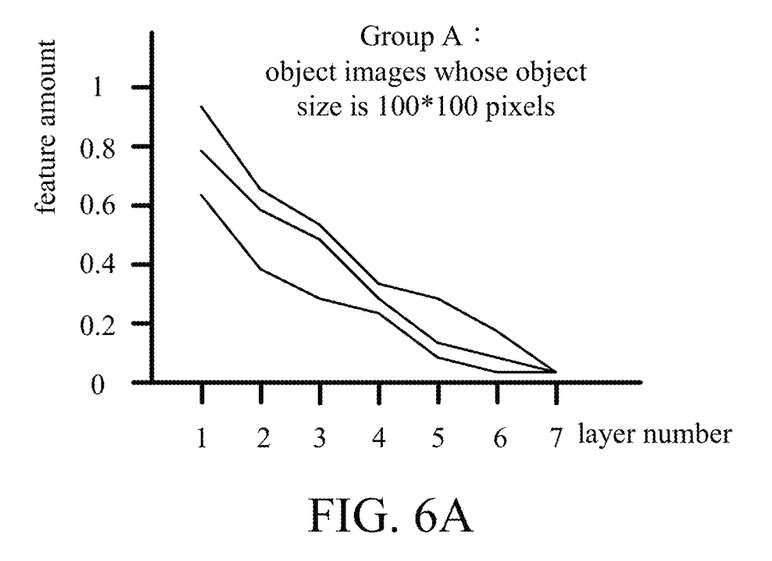
FIG. 6A depicts a specific example of the feature amount distribution curves of a group of object size 100*100 pixels.
Figure 6B:
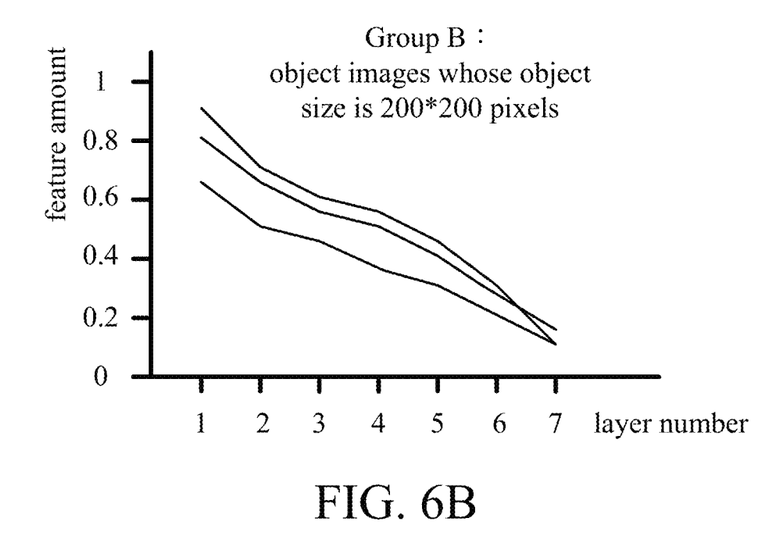
FIG. 6B depicts a specific example of the feature amount distribution curves of a group of object size 200*200 pixels.

For comprehension, please refer to a specific example shown in FIG. 6A and FIG. 6B, which, however, is not intended to limit the scope of the present invention. In this specific example, the processor 33 sets two size ranges from a plurality of sizes of the object images 31a, 31b, . . . , 31x. For example, one of them is a size range of approximately 100*100 pixels and the other of them is a size range of approximately 200*200 pixels, which will be represented as the object size of 100*100 pixels and the object size of 200*200 pixels in the following paragraphs. The processor 33 inputs the object images 31a, 31b, . . . , 31x to the convolutional neural network and generates the feature amounts corresponding to each of the convolution layers of the object images 31a, 31b, . . . , 31x according to the aforesaid calculation. In addition, the processor 33 divides the object images 31a, 31b, . . . , 31x into the group A (i.e., the object size is 100*100 pixels or approximately 100*100 pixels) and the group B (i.e., the object size is 200*200 pixels or approximately 200*200 pixels) according to the sizes of the object images 31a, 31b, . . . , 31x.

FIG. 6A and FIG. 6B respectively depict the feature amount distribution curves of the object images included in the group A and the group B. From a feature amount distribution curve, the feature amount corresponding to each convolution layer for each object image can be learned. It is assumed that the preset threshold is 0.2. The feature amounts of the group A (corresponding to the object size of 100*100 pixels) begin to be less than the preset threshold from the fifth convolution layer, which means that the common invalid layer start number of the group A is 5. The feature amounts of the group B (corresponding to the object size of 200*200 pixels) begin to be less than the preset threshold from the seventh convolution layer, which means that the common invalid layer start number of the group B is 7.

For each group, the processor 33 selects the previous layer or the previous n layers (i.e., the convolution layer(s) that will not generate an invalid feature map) whose layer number(s) is/are less than the corresponding common invalid layer start number as the feature map extraction recommendation. Please still refer to the specific example in FIG. 6A and FIG. 6B. For the object size of 100*100 pixels, the processor 33 selects one convolution layer or more than one convolution layers (e.g., the second, the third, and the fourth convolution layers) from the first convolution layer to the fourth convolution layer (i.e., the convolution layers whose layer number are less than the smallest invalid layer start number 5) as the feature map extraction recommendation. For the object size of 200*200 pixels, the processor 33 selects one convolution layer or more than one convolution layers (e.g., the fourth, the fifth, and the sixth convolution layers) from the first convolution layer to the sixth convolution layer (i.e., the convolution layers whose layer numbers are less than the smallest invalid layer start number 7) as the feature map extraction recommendation.

As described above, the feature map extraction recommendation determined by processor 33 for different object sizes can be used in the training phase or recognition phase of the convolutional neural network. Please still refer to the specific example in FIG. 6A and FIG. 6B. To enhance the training of the convolutional neural network or/and the identification results, the processor 33 extracts the feature maps correspond to the second, third, and fourth convolution layers for the object images with the object size of 100*100 pixels and extracts the feature maps correspond to the fourth, fifth, and sixth convolution layers for the object images with the object size of 200*200 pixels in the training phase or/and the recognition phase of the convolutional neural network. It shall be appreciated that the way of using the feature maps to train the convolutional neural network and the way of using the feature maps to improve the recognition accuracy of the convolutional neural network shall be appreciated by those of ordinary skill in the art and, thus, will not be further described herein.

In some embodiments, the convolutional neural network is a depth-wise separable convolution neural network. In these embodiments, the feature determination apparatus 3 may further generate a hybrid convolutional neural network based on the invalid start layer numbers of the object images 31a, 31b, . . . , 31x.

Specifically, the processor 33 determines a switch layer number by counting the invalid start layer numbers of the object images 31a, 31b, . . . , 31x. For example, the processor 33 determines the smallest invalid layer start number as the switch layer number after counting the invalid layer start numbers. In another example, the processor 33 determines the invalid layer start number having the largest number of counts as the switch layer number after counting the invalid layer start numbers. Next, the processor 33 generates a hybrid convolutional neural network having a plurality of convolution layers according to the switch layer number, wherein the convolution layers which are shallower than the switch layer number adopt a depth-wise separable convolution architecture and the convolution layers which are not shallower than the switch layer number adopt a conventional convolution architecture. In some embodiments, each of the convolution layers of the depth-wise separable convolutional neural network has at least two filters to perform a depth-wise convolution operation and a point-wise convolution respectively.

For comprehension, please refer to a specific example shown in FIG. 5B, which, however, is not intended to limit the scope of the present invention. As described above, in this specific example, the invalid layer start numbers of the object images 31a, 31b, and 31x are 5, 4, and 6 respectively. After the processor 33 counts the invalid layer start numbers, the processor 33 selects the smallest invalid layer start number as the switch layer number (i.e., 4). Next, the processor 33 generates a hybrid convolutional neural network having a plurality of convolution layers as an image object detection model according to the switch layer number. Specifically, in the hybrid convolutional neural network, the convolution layers shallower than the switch layer number adopt a depth-wise separable convolution architecture, while the convolution layers which are not shallower than the switch layer number adopt a conventional convolution architecture. Please refer to a schematic view of a hybrid convolutional neural network 7 in FIG. 7. When the switch layer number is t, the first to the (t-1)$^{th}$ convolution layer of the hybrid convolutional neural network 7 adopt a depth-wise separable convolution architecture and the t$^{th}$ to the m$^{th}$ layer adopt a conventional convolution architecture. The variable t and the variable m are both positive integers, wherein t is smaller than m.

Figure 7:
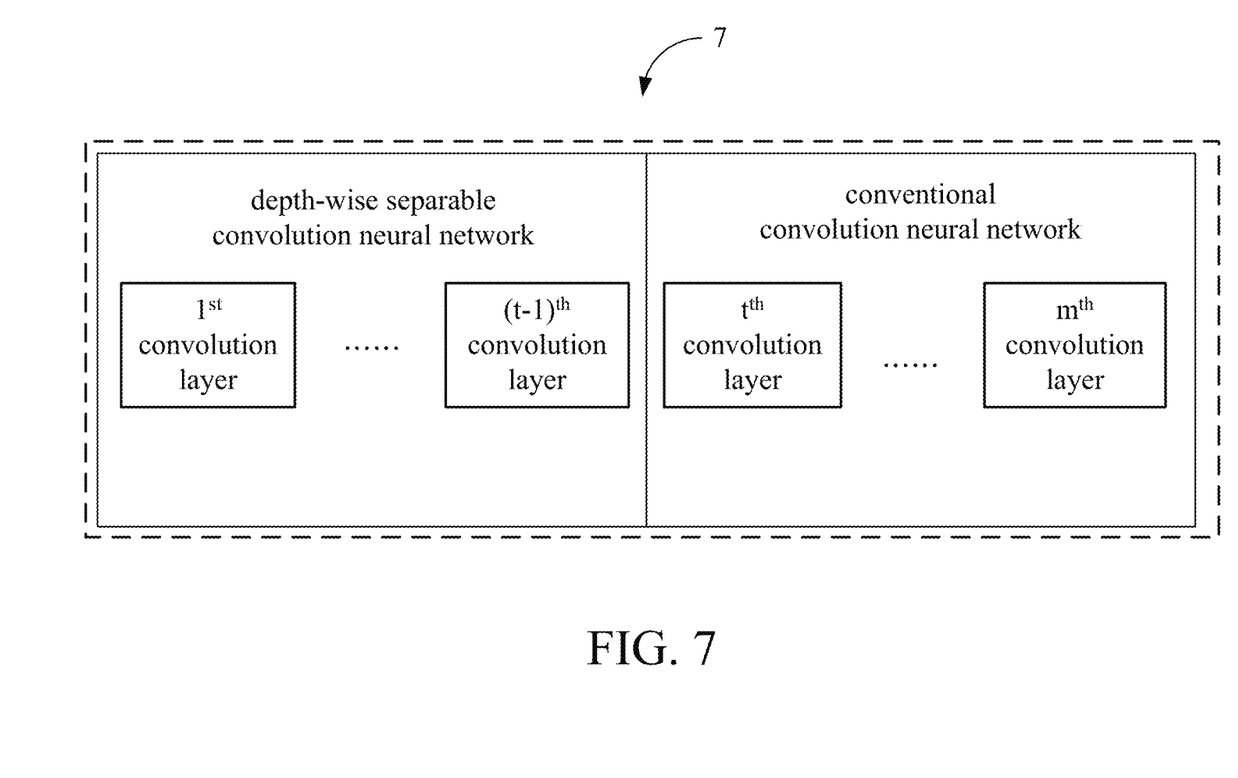
FIG. 7 depicts a schematic view of a hybrid convolutional neural network 7.

Those of ordinary skill in the art shall appreciate that the convolution layers corresponding to a depth-wise separable convolution architecture requires fewer computational parameters. The shallow convolution layers of the hybrid convolutional neural network 7 (i.e., the convolution layers shallower than the switch layer number) adopt a depth-wise separable convolution architecture, which means that the hybrid convolutional neural network 7 performs convolution operations with a low computational cost architecture when the information of the feature maps of an image is still sufficient. The deep convolution layers of the hybrid convolutional neural network 7 (i.e., the convolution layers not shallower than the switch layer number) adopt a conventional convolution architecture, which means that the hybrid convolutional neural network 7 no longer uses the calculation method with fewer computational parameters when the information of the feature maps of an image is low. Hence, the probability of generating an invalid feature map can be reduced and waste of computation resources can be avoided. Therefore, adopting the hybrid convolutional neural network 7 as an image object detection model can improve the efficiency of object detection and can solve the problems that the conventional deep learning model requires a large number of conventional convolution operations, has high demand in hardware and is hard to be realized on an embedded platform.

In some embodiments, for the hybrid convolutional neural network 7, the processor 33 can provide the feature map extraction recommendation for different object sizes for use in the training phase and/or recognition phase of the hybrid convolutional neural network 7. Briefly, during the training phase, the processor 33 supplies the images to be used for training to the hybrid convolutional neural network 7, determines the convolution layers to extract the feature maps therefrom based on the size of the object in the image, and then uses the images and the feature maps to train the hybrid convolutional neural network 7. Similarly, during the recognition phase, the processor 33 supplies the images to be recognized/detected to the trained hybrid convolutional neural network 7 and determines the convolution layers to extract the feature maps therefrom based on the size of the object in the image so that the hybrid convolutional neural network 7 can perform object recognition/detection based on the images and the feature maps.

According to the above descriptions, the feature determination apparatus 3 determines the invalid layer start numbers of each object image by analyzing the feature amount of each feature map regarding each object image in the convolution layer of the convolutional neural network, and determines a feature map extraction recommendation for each of the object sizes based on the object size and the invalid layer start number of each object image. Through the aforesaid operations, the feature determination apparatus 3 provides different feature map extraction recommendation for different object size, thereby overcome the problems of extracting invalid feature maps and performing meaningless calculation due to only extracting feature maps correspond to one (or some) fixed convolution layer of the conventional technologies.

In addition, the feature determination apparatus 3 may further generate a hybrid convolutional neural network as an image object detection model by analyzing and counting, for each object image, the feature amount of each feature map corresponding to each convolution layer of a depth-wise separable convolutional neural network. The shallow convolution layers of the hybrid convolutional neural network adopt a depth-wise separable convolution architecture, which means that the hybrid convolutional neural network performs convolution operations with a low computational cost architecture when the information of the feature maps of an image is sufficient and thereby achieve a lightweight effect. The deep convolution layers of the hybrid convolutional neural network adopt a conventional convolution architecture, which means that the hybrid convolutional neural network no longer uses the calculation method with fewer computational parameters when the information of the feature maps of an image is low. Hence, the probability of generating an invalid feature map can be reduced and the waste of computation resources can be avoided. By providing a hybrid convolutional neural network with both the depth-wise separable convolution architecture and the conventional convolution architecture, the lightweight effect can be achieved. In addition, by using the hybrid convolutional neural network as an image object detection model, accuracy of object detection and recognition can be efficiently improved.

Figure 8:
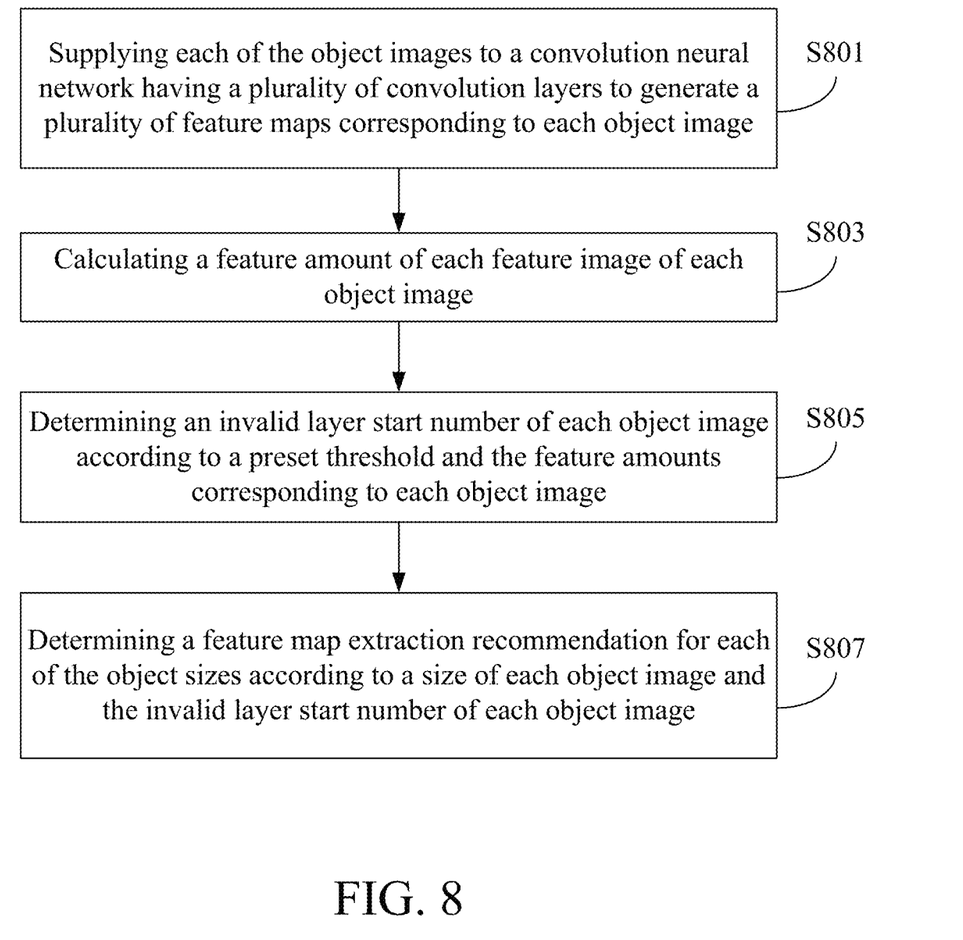
FIG. 8 depicts a partial flowchart of the feature determination method adapted to multiple object sizes of the second embodiment.

A second embodiment of the present invention is a feature determination method adapted to multiple object sizes (hereinafter referred to as "feature determination method") and a flowchart thereof is depicted in FIG. 8. The feature determination method is adapted for an electronic apparatus (e.g., the feature determination apparatus 3 of the first embodiment). The electronic apparatus stores a plurality of object images, such as the object images 31a, 31b, . . . , 31x in the first embodiment. The feature determination method determines a feature map extraction recommendation for each of the object sizes through the steps S801 to S807.

In step S801, the electronic apparatus supplies each of the object images to a convolution neural network having a plurality of convolution layers to generate a plurality of feature maps corresponding to each object image, wherein each of the feature maps corresponds to one of the convolution layers. Each convolution layer of the convolutional neural network has at least one filter to perform the convolution operations. It shall be appreciated that the present invention does not limit the number of filters that a convolution layer has. For convenience, the following paragraphs are based on the situation that a convolution layer has one filter. As to the situation that a convolution layer has multiple layers, those of ordinary skill in the art shall easily appreciate the required operations according to the following descriptions.

In step S803, the electronic apparatus calculates a feature amount of each feature image of each object image. A feature map includes a plurality of cells. In some embodiments, the feature amount is a ratio between an amount of non-zero cell and an amount of total cell on the corresponding feature map. In some embodiments, the feature amount is an amount of non-zero cell on the corresponding feature map.

Next, in step S805, the electronic apparatus determines an invalid layer start number of each object image according to a preset threshold and the feature amounts corresponding to each object image, wherein each of the invalid layer start numbers corresponds to one of the convolution layers. In some embodiments, the step S805 determines the invalid layer start number of each object image by comparing the feature amounts corresponding to each object image with the preset threshold value.

Thereafter, in step S807, the electronic apparatus determines a feature map extraction recommendation for each of the object sizes according to a size of each object image and the invalid layer start number of each object image. In some embodiments, the step S807 comprises a step for dividing the object images into a plurality of groups according to the size of each object image and another step for determining the feature map extraction recommendation by counting the invalid layer start numbers of the object images of the group. The feature map extraction recommendation for different object sizes determined by the step S807 can be used in the training phase and/or recognition phase of the convolutional neural network.

In some embodiments, the convolution neural network mentioned in the step S801 is a depth-wise separable convolution neural network. The feature determination method may further generate a hybrid convolutional neural network by the steps S901 to S903 shown in FIG. 9.

Figure 9:
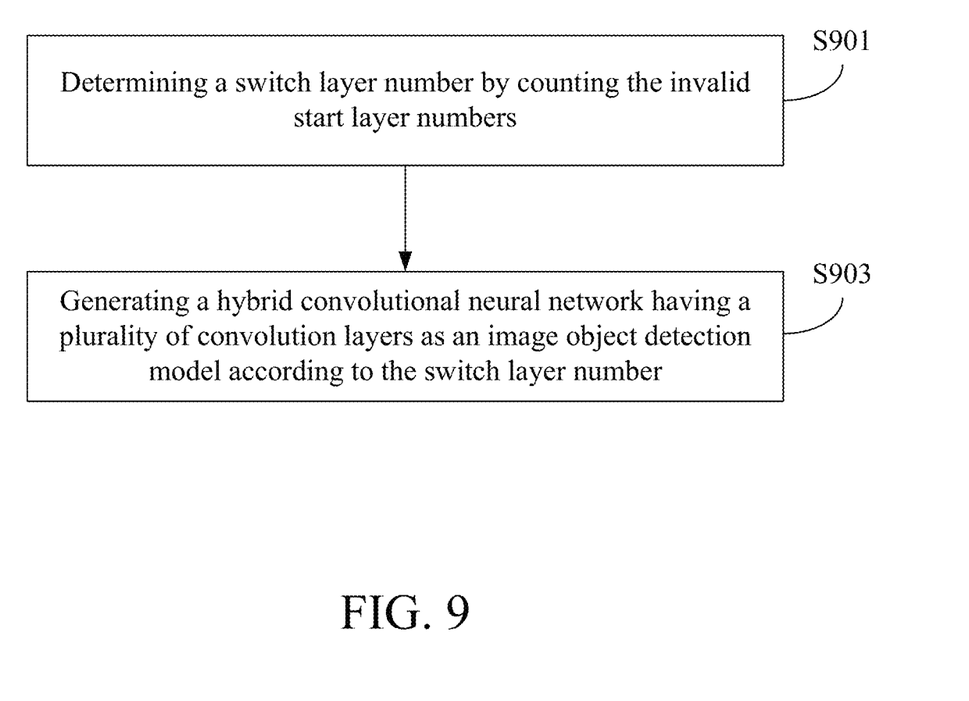
FIG. 9 depicts a partial flowchart of the method performed by some embodiments.

In the step S901, the electronic apparatus determines a switch layer number by counting the invalid start layer numbers. Next, in step S903, the electronic apparatus generates a hybrid convolutional neural network having a plurality of convolution layers as an image object detection model according to the switch layer number, wherein the convolution layers which are shallower than the switch layer number adopt a depth-wise separable convolution architecture and the convolution layers which are not shallower than the switch layer number adopt a conventional convolution architecture. In some embodiments, each convolution layer of the depth-wise separable convolution neural network includes a depth-wise convolution operation and a point-wise convolution operation.

In addition to the aforesaid steps, the second embodiment can also execute all the operations and steps of the feature determination apparatus 3 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present invention, some words (e.g., convolution layer and feature map) are preceded by terms such as "first" or "second," and these terms of "first" and "second" are only used to distinguish these different words. For example, the "first" and "second" in the first convolution layer and the second convolution layer are only used to indicate the convolution layer used in different stages.

According to the above descriptions, the feature determination technology (including the apparatus and the method) adapted to a plurality of object sizes provided by the present invention determines an invalid layer start number of each object image by analyzing the feature amount of each feature map regarding each object image in a plurality of convolution layers of the convolutional neural network, and determines a feature map extraction recommendation for each of the object sizes based on the object size and the invalid layer start number of each object image. Through the aforesaid operations, the feature determination technology adapted to a plurality of object sizes provided by the present invention provides different feature map extraction recommendation for different object size, thereby overcome the problems of extracting invalid feature maps and performing meaningless calculation due to only extracting feature maps corresponding to one (or some) fixed convolution layer of the conventional technologies.

In addition, the feature determination technology adapted to a plurality of object sizes provided by the present invention generates a hybrid convolutional neural network as an image object detection model by counting the invalid start layer numbers. By providing a hybrid convolutional neural network with both the depth-wise separable convolution architecture and the conventional convolution architecture, the lightweight effect can be achieved. Moreover, by using the hybrid convolutional neural network as an image object detection model, accuracy of object detection and recognition can be efficiently improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A feature determination apparatus adapted to a plurality of object sizes, comprising:
 a storage, storing a plurality of object images;
 a processor, being electrically connected to the storage and configured to perform at least the following operations:
  supplying each of the object images to a convolution neural network having a plurality of first convolution layers to generate a plurality of first feature maps corresponding to each object image, wherein each of the first feature maps corresponds to one of the first convolution layers;

calculating a feature amount of each first feature map of each object image;

determining an invalid layer start number of each object image according to a preset threshold and the feature amounts corresponding to each object image, wherein each of the invalid layer start numbers corresponds to one of the first convolution layers; and determining a feature map extraction recommendation for each of the object sizes according to a size of each object image and the invalid layer start number of each object image, wherein each of the feature map extraction recommendations corresponds to a portion of the first convolution layers, and the feature map extraction recommendations are further used in one of a training phase and a recognition phase of a convolutional neural network to enhance an object identification result.

2. The feature determination apparatus of claim 1, wherein the processor determines the feature map extraction recommendations by performing at least the following operations:

dividing the object images into a plurality of groups according to the size of each object image; and performing the following operations for each of the groups:

determining the feature map extraction recommendation by counting the invalid layer start numbers of the object images of the group.

3. The feature determination apparatus of claim 1, wherein each of the feature amount is a ratio between an amount of non-zero cell and an amount of total cell on a corresponding first feature map.

4. The feature determination apparatus of claim 1, wherein each of the feature amount is an amount of non-zero cell on a corresponding first feature map.

5. The feature determination apparatus of claim 1, wherein the processor determines the invalid layer start number of each object image by comparing the feature amount corresponding to each object image with the preset threshold value.

6. The feature determination apparatus of claim 1, wherein the convolution neural network is a depth-wise separable convolution neural network, and the processor further performs at least the following operations:

determining a switch layer number by counting the invalid start layer numbers; and generating a hybrid convolutional neural network having a plurality of second convolution layers according to the switch layer number, wherein the second convolution layers which are shallower than the switch layer number adopt a depth-wise separable convolution architecture, and the second convolution layers which are not shallower than the switch layer number adopt a conventional convolution architecture.

7. The feature determination apparatus of claim 6, wherein each second convolution layer of the depth-wise separable convolution neural network includes a depth-wise convolution operation and a point-wise convolution operation.

8. A feature determination method adapted to a plurality of object sizes, being adapted for use in an electronic apparatus, the electronic apparatus storing a plurality of object images, and the feature determination method comprising:

supplying each of the object images to a convolution neural network having a plurality of first convolution layers to generate a plurality of first feature maps corresponding to each object image, wherein each of the first feature maps corresponds to one of the first convolution layers;

calculating a feature amount of each first feature map of each object image;

determining an invalid layer start number of each object image according to a preset threshold and the feature amounts corresponding to each object image, wherein each of the invalid layer start numbers corresponds to one of the first convolution layers; and determining a feature map extraction recommendation for each of the object sizes according to a size of each object image and the invalid layer start number of each object image, wherein each of the feature map extraction recommendations corresponds to a portion of the first convolution layers, and the feature map extraction recommendations are further used in one of a training phase and a recognition phase of a convolutional neural network to enhance an object identification result.

9. The feature determination method of claim 8, wherein the step of determining the feature map extraction recommendations comprises:

dividing the object images into a plurality of groups according to the size of each object image; and performing the following operations for each of the groups:

determining the feature map extraction recommendation by counting the invalid layer start numbers of the object images of the group.

10. The feature determination method of claim 8, wherein each of the feature amount is a ratio between an amount of non-zero cell and an amount of total cell on a corresponding first feature map.

11. The feature determination method of claim 8, wherein each of the feature amount is an amount of non-zero cell on a corresponding first feature map.

12. The feature determination method of claim 8, wherein the step of determining the invalid layer start number of each object image determines the invalid layer start number of each object image by comparing the feature amount corresponding to each object image with the preset threshold value.

13. The feature determination method of claim 8, wherein the convolution neural network is a depth-wise separable convolution neural network, and the feature determination method further comprises:

determining a switch layer number by counting the invalid start layer numbers; and generating a hybrid convolutional neural network having a plurality of second convolution layers according to the switch layer number, wherein the second convolution layers which are shallower than the switch layer number adopt a depth-wise separable convolution architecture, and the second convolution layers which are not shallower than the switch layer number adopt a conventional convolution architecture.

14. The feature determination method of claim 13, wherein each second convolution layer of the depth-wise separable convolution neural network includes a depth-wise convolution operation and a point-wise convolution operation.

* * * * *